United States Patent
Cheng et al.

(10) Patent No.: US 8,351,362 B2
(45) Date of Patent: Jan. 8, 2013

(54) METHODS AND SYSTEMS FOR BROADCASTING ALERT AND SYNCHRONIZATION

(75) Inventors: Steven D. Cheng, San Diego, CA (US); Patrick Lim, San Diego, CA (US); Fangqi Hu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 12/703,157

(22) Filed: Feb. 9, 2010

(65) Prior Publication Data

US 2010/0208640 A1  Aug. 19, 2010

Related U.S. Application Data

(60) Provisional application No. 61/152,634, filed on Feb. 13, 2009.

(51) Int. Cl.
*G08C 17/00* (2006.01)
*H04B 7/185* (2006.01)
*H04B 7/208* (2006.01)
*H04W 4/00* (2009.01)
*H04W 72/00* (2009.01)

(52) U.S. Cl. ........ 370/311; 370/318; 370/319; 370/338; 370/344; 455/450

(58) Field of Classification Search .......... 370/310–350; 455/431–466
See application file for complete search history.

(56) References Cited

U.S. PATENT DOCUMENTS

| | | | |
|---|---|---|---|
| 2006/0029011 A1 | 2/2006 | Etemad et al. | |
| 2008/0132298 A1* | 6/2008 | Roh et al. | 455/574 |
| 2009/0298504 A1* | 12/2009 | Lee et al. | 455/437 |
| 2010/0027468 A1* | 2/2010 | Rajadurai et al. | 370/328 |
| 2010/0075592 A1* | 3/2010 | Kim et al. | 455/3.01 |
| 2010/0118797 A1* | 5/2010 | Park et al. | 370/329 |
| 2010/0271995 A1* | 10/2010 | Seok et al. | 370/311 |
| 2011/0051668 A1* | 3/2011 | Lee et al. | 370/328 |
| 2011/0128900 A1* | 6/2011 | Seok | 370/311 |

(Continued)

FOREIGN PATENT DOCUMENTS

WO  WO2006071096  7/2006

OTHER PUBLICATIONS

"IEEE Standard for Local and Metropolitan Area Networks Part 16: Air Interface for Fixed and Mobile Broadband Wireless Access Systems Amendment 2: Physical and Medium Access Control Layers for Combined Fixed and Mobile Operation in Licensed Bands and Corrigendum 1"; IEEE Std 802.16e-2005 and IEEE Std 802.16/2004/Cor1-2005, Feb. 28, 2006.*

(Continued)

*Primary Examiner* — Tri H Phan
(74) *Attorney, Agent, or Firm* — Tyler J. Overall

(57) ABSTRACT

Methods and apparatus for waking a mobile station (MS) from a power saving mode to receive a media access control (MAC) management message (e.g., DCD/UCD, MOB_NBR-ADV, and SII-ADV) the MS has not yet received. The MS may wake from the power saving mode after detecting a mismatch between a set of media access control (MAC) management message parameters last received by the MS and the information found in an enhanced broadcast control pointer information element (BCP-IE) transmitted in a downlink map (DL-MAP). In this manner, the MS may be prevented from waking up unnecessarily, thereby providing high power efficiency.

24 Claims, 14 Drawing Sheets

U.S. PATENT DOCUMENTS

| | | | | |
|---|---|---|---|---|
| 2011/0261739 | A1* | 10/2011 | Fong et al. | 370/311 |
| 2012/0014355 | A1* | 1/2012 | Jung et al. | 370/331 |
| 2012/0113940 | A1* | 5/2012 | Cho et al. | 370/329 |
| 2012/0113947 | A1* | 5/2012 | Kim et al. | 370/329 |

OTHER PUBLICATIONS (Feb. 28, 2006), IEEE Std; IEEE, 3 Park Avenue, NY, USA, pp. 47,48,120-127,228-265,423,424; paragraphs [6.3.21.1], [6.3.24.5] paragraphs [8.4.5.3.25], [6.3.2.3.2] paragraph [6.3.2.3.47].*

IEEE Standards: "IEEE Standard for Local and Metropolitan Area Networks Part 16: Air Interface for Fixed and Mobile Broadband Wireless Access Systems; Amendment 2: Physical and Medium Access Control Layers for Combined Fixed and Mobile Operation in Licensed Bands and Corrigendum 1; IEEE Std 802.16e-2005 and IEEE Std 8," (Jan. 1, 2006), Piscataway, NJ, USA, pp. 47,48, 120-127, 228-265, 423, 424, XP002581098, ISBN: 9780738148564, paragraphs [6.3.21.1], [6.3.24.5] paragraphs [8.4.5.3.25], [6.3.2.3.2] paragraph [6.3.2.3.47].

International Search Report—PCT/US2010/024136, International Search Authority—European Patent Office—Jun. 8, 2010.

Written Opinion—PCT/US2010/024136—ISA/EPO—Jun. 8, 2010.

* cited by examiner

| Syntax | Size | Notes |
|---|---|---|
| Broadcast Control Pointer IE() { | — | — |
| Extended DIUC | 4 bits | FDN = 0x0A |
| Length | 4 bits | Length in bytes |
| DCD_UCD Configuration Change Counter | 4 bits | A composite configuration change counter incremented for each change in either DCD or UCD |
| DCD_UCD Transmission Frame | 8 bits | The least significant eight bits of the frame number of the next DCD and/or UCD transmission. |
| Skip Broadcast_System_Update | 1 bit | — |
| If (Skip Broadcast_System_Update = 0) { | — | — |
| Broadcast_System_Update_Type | 3 bits | Shows the type of Broadcast_System_Update 0b000: For MOB_NBR-ADV Update 0b001: For Emergency Services Message 0b010 – 0b111: Reserved |
| Broadcast_System_Update_Transmission_Frame | 8 bits | The least significant eight bits of the frame number of the next Broadcast_System_Update_Transmission. |
| } else { | — | — |
| Reserved | 3 bits | Shall be set to zero. |
| } | — | — |
| } | — | — |

FIG. 6B

METHODS AND SYSTEMS FOR BROADCASTING ALERT AND SYNCHRONIZATION

CLAIM OF PRIORITY

This application claims the benefit of priority from U.S. Provisional Patent Application Ser. No. 61/152,634, entitled "Methods and Systems for Alerting and Synchronization for Robust DCD/UCD and MOB_NBR-ADV Broadcasting" and filed Feb. 13, 2009, which is assigned to the assignee of this application and is fully incorporated by reference herein for all purposes.

TECHNICAL FIELD

Certain embodiments of the present disclosure generally relate to wireless communication and, more particularly, to waking a mobile station (MS) from a power saving mode to receive a media access control (MAC) management message the MS has not yet received.

BACKGROUND

Orthogonal frequency-division multiplexing (OFDM) and orthogonal frequency division multiple access (OFDMA) wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations.

In current versions of the IEEE 802.16 standard, a base station (BS) may broadcast one or more media access control (MAC) management messages to the mobile stations (MSs) to which service is provided. At times, the parameters of a MAC management message may change resulting in a new version of the MAC management message. The new version of the MAC management message may then be sent to the MSs allowing the MSs to reconfigure to accommodate the new parameters. These changes may be tracked by a configuration change counter (CCC).

However, there may be situations in which it is convenient for an MS to negotiate periods of unavailability in an effort to conserve power. Consequently, if an MS is in an unavailable state when a MAC management message broadcasts the new version of the MAC management message, the MS may not receive the MAC management message. This may result in a mismatch between the current version of the MAC management message and the configuration of the MS.

If there is a mismatch between the configuration of the MS and the DL-MAP information included in the PDUs, the MS may discard subsequent PDUs until the MAC management parameters are updated and the MS receives PDU messages with matching DL-MAP information. As a result, the MS may lose all data packets transmitted before the MAC management parameters and the DL-MAP information are synchronized resulting in a drop in data throughput.

In some scenarios, the MS may have to wait for 30 seconds before receiving a PDU including matching MAC management parameters because the BS may not be aware of the situation. Also, the MS may experience increased power consumption even if the PDUs do not require action on the part of the MS, as the MS may wait for the reception of an updated MAC management message before entering a sleep state.

SUMMARY

Certain embodiments of the present disclosure provide a method for wireless communications. The method generally includes receiving, during a listening interval of a low power state, a first message with a broadcast control pointer information element (BCP-IE) indicating when a media access control (MAC) management message will be sent, determining if a version of the MAC management message to be sent matches a previously received version of the MAC management message, and altering the schedule of the low power state to wake-up and receive the MAC management message if the version of the MAC management message to be sent does not match the previously received version.

Certain embodiments of the present disclosure provide a method for wireless communications via orthogonal frequency-division multiplexing (OFDM) or multiple access (OFDMA). The method generally includes determining a set of one or more mobile stations (MSs) that are in an unavailable state, determining a set of frames in which to send a new MAC management message such that the new MAC management message is received by each MS in the set of MSs prior to the new MAC management message taking effect, and transmitting the new MAC management message during each frame in the set of frames.

Certain embodiments provide an apparatus for wireless communications. The apparatus generally includes logic for receiving, during a listening interval of a low power state, a message with a broadcast control pointer information element (BCP-IE) indicating when a media access control (MAC) management message will be sent, logic for determining if a version of the MAC management message to be sent matches a previously received version of the MAC management message, and logic for altering the schedule of the low power state to wake-up and receive the MAC management message if the version of the MAC management message to be sent does not match the previously received version.

Certain embodiments provide an apparatus for wireless communications via orthogonal frequency-division multiplexing (OFDM) or multiple access (OFDMA). The apparatus generally includes logic for determining a set of one or more mobile stations (MSs) that are in an unavailable state, logic for determining a set of frames in which to send a new media access control (MAC) management message such that the new MAC management message is received by each MS in the set of MSs prior to the new MAC management message taking effect, and logic for transmitting the new MAC management message during each frame in the set of frames.

Certain embodiments provide an apparatus for wireless communications. The apparatus generally includes means for receiving, during a listening interval of a low power state, a message with a broadcast control pointer information element (BCP-IE) indicating when a media access control (MAC) management message will be sent, means for determining if a version of the MAC management message to be sent matches a previously received version of the MAC management message, and means for altering the schedule of the low power state to wake-up and receive the MAC management message if the version of the MAC management message to be sent does not match the previously received version.

Certain embodiments provide an apparatus for wireless communications via orthogonal frequency-division multiplexing (OFDM) or multiple access (OFDMA). The apparatus generally includes means for determining a set of one or more mobile stations (MSs) that are in an unavailable state, means for determining a set of frames in which to send a new media access control (MAC) management message such that the new MAC management message is received by each MS in the set of MSs prior to the new MAC management message taking effect, and means for transmitting the new MAC management message during each frame in the set of frames.

Certain embodiments provide a computer-program storage apparatus for wireless communications comprising a memory device having a set of instructions stored thereon, the set of instructions being executable by one or more processors. The set of instructions generally include instructions for receiving, during a listening interval of a low power state, a message with a broadcast control pointer information element (BCP-IE) indicating when a media access control (MAC) management message will be sent, instructions for determining if a version of the MAC management message to be sent matches a previously received version of the MAC management message, and instructions for altering the schedule of the low power state to wake-up and receive the MAC management message if the version of the MAC management message to be sent does not match the previously received version.

Certain embodiments provide a computer-program storage apparatus for wireless communications comprising a memory device having a set of instructions stored thereon, the set of instructions being executable by one or more processors. The set of instructions generally include instructions for determining a set of one or more mobile stations (MSs) that are in an unavailable state, instructions for determining a set of frames in which to send a new media access control (MAC) management message such that the new MAC management message is received by each MS in the set of MSs prior to the new MAC management message taking effect, and instructions for transmitting the new MAC management message during each frame in the set of frames.

BRIEF DESCRIPTION OF THE DRAWINGS

So that the manner in which the features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIGS. 6A and 6B illustrate an example format and the bit size of entries in a downlink map (DL-MAP) message with a generic DL-MAP information element (IE) and a broadcast control pointer information element (BCP-IE).

DETAILED DESCRIPTION

Certain embodiments of the present disclosure provide methods and apparatus for waking a mobile station (MS) from a power saving mode to receive a media access control (MAC) management message (e.g., DCD/UCD, MOB_NBR-ADV, and SII-ADV) the MS has not yet received. The MS may wake from the power saving mode after detecting a mismatch between a set of media access control (MAC) management message parameters last received by the MS and the information found in an enhanced broadcast control pointer information element (BCP-IE) transmitted in a downlink map (DL-MAP). In this manner, the MS may be prevented from waking up unnecessarily, thereby providing high power efficiency.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

Figure 1:
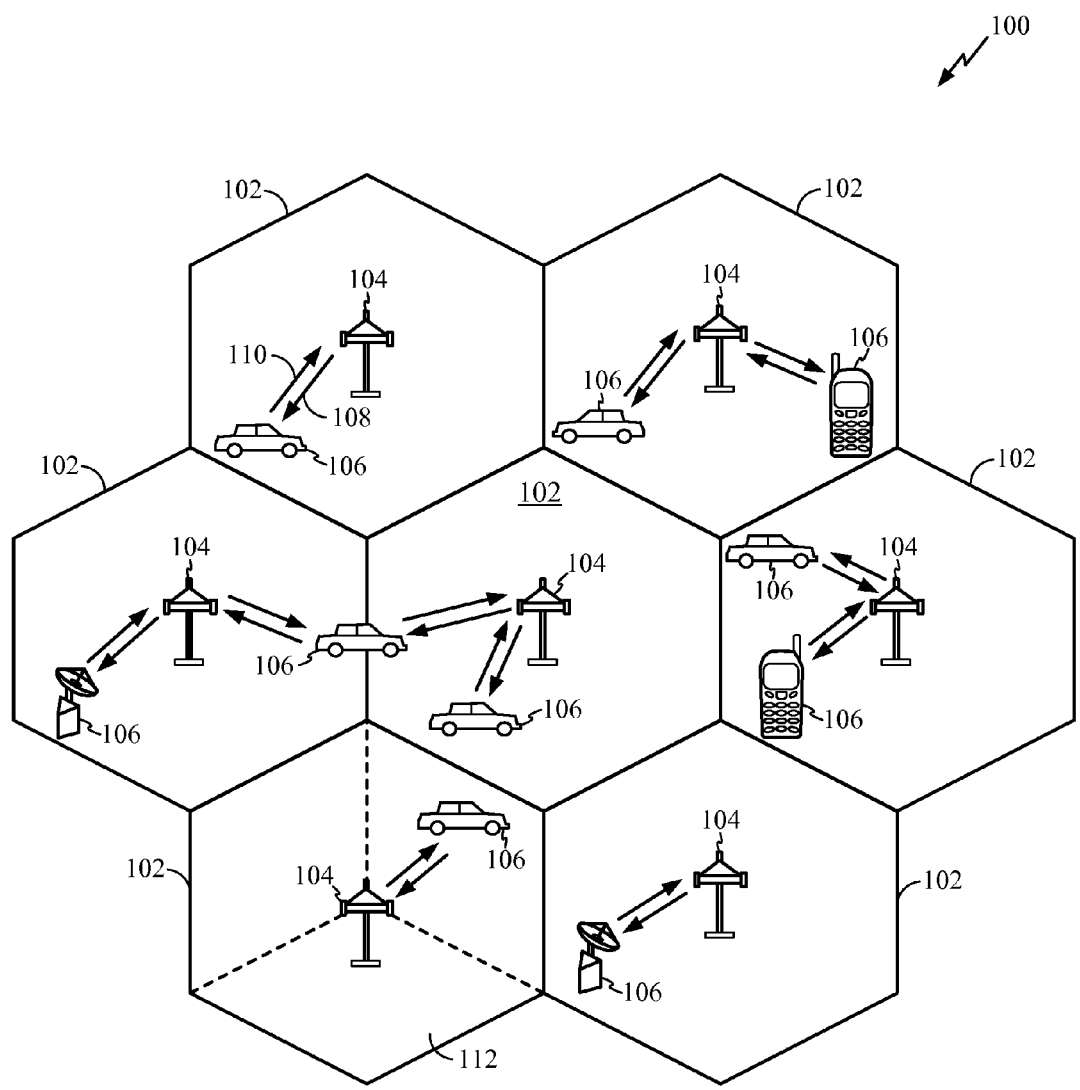
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
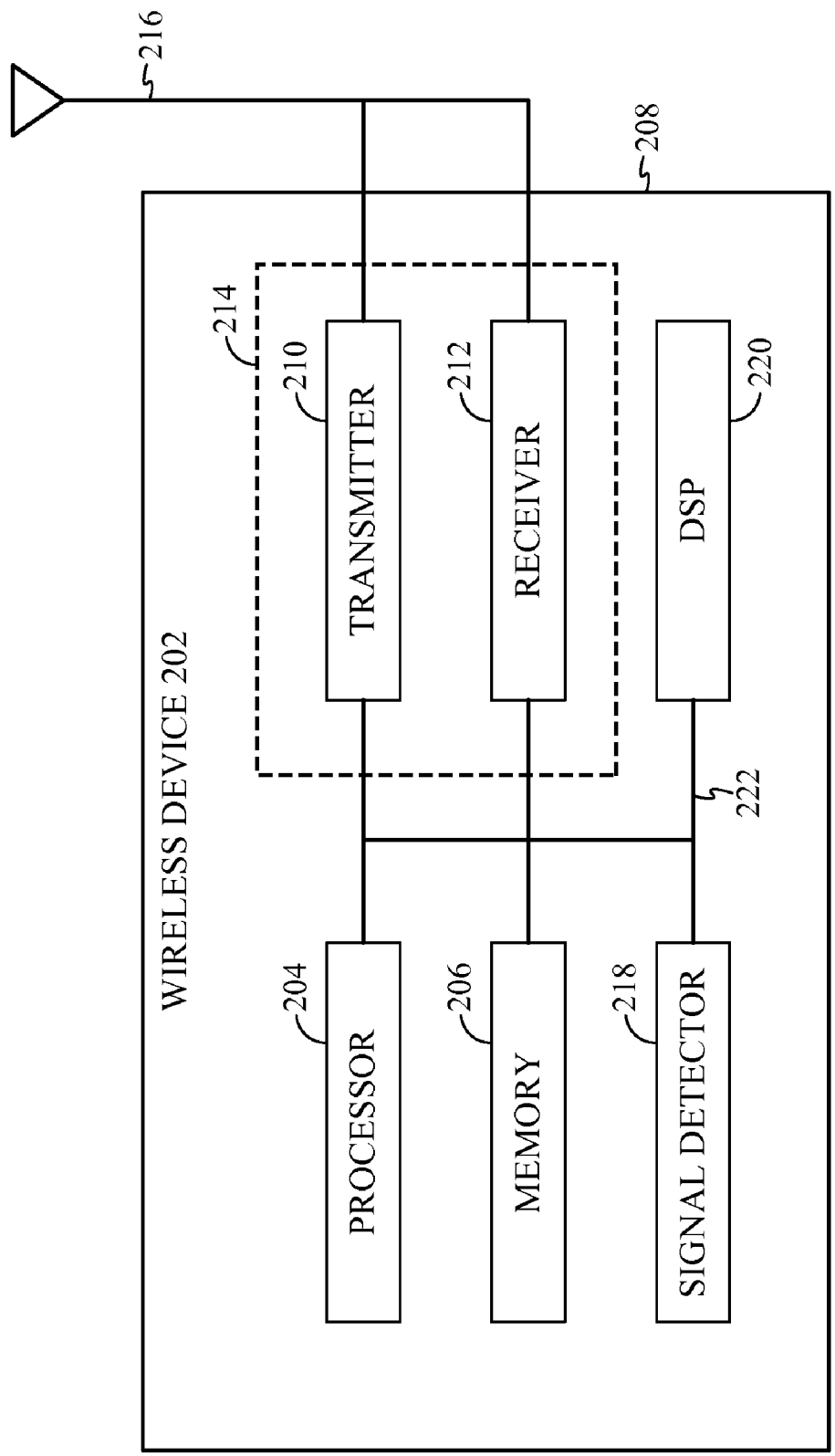
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
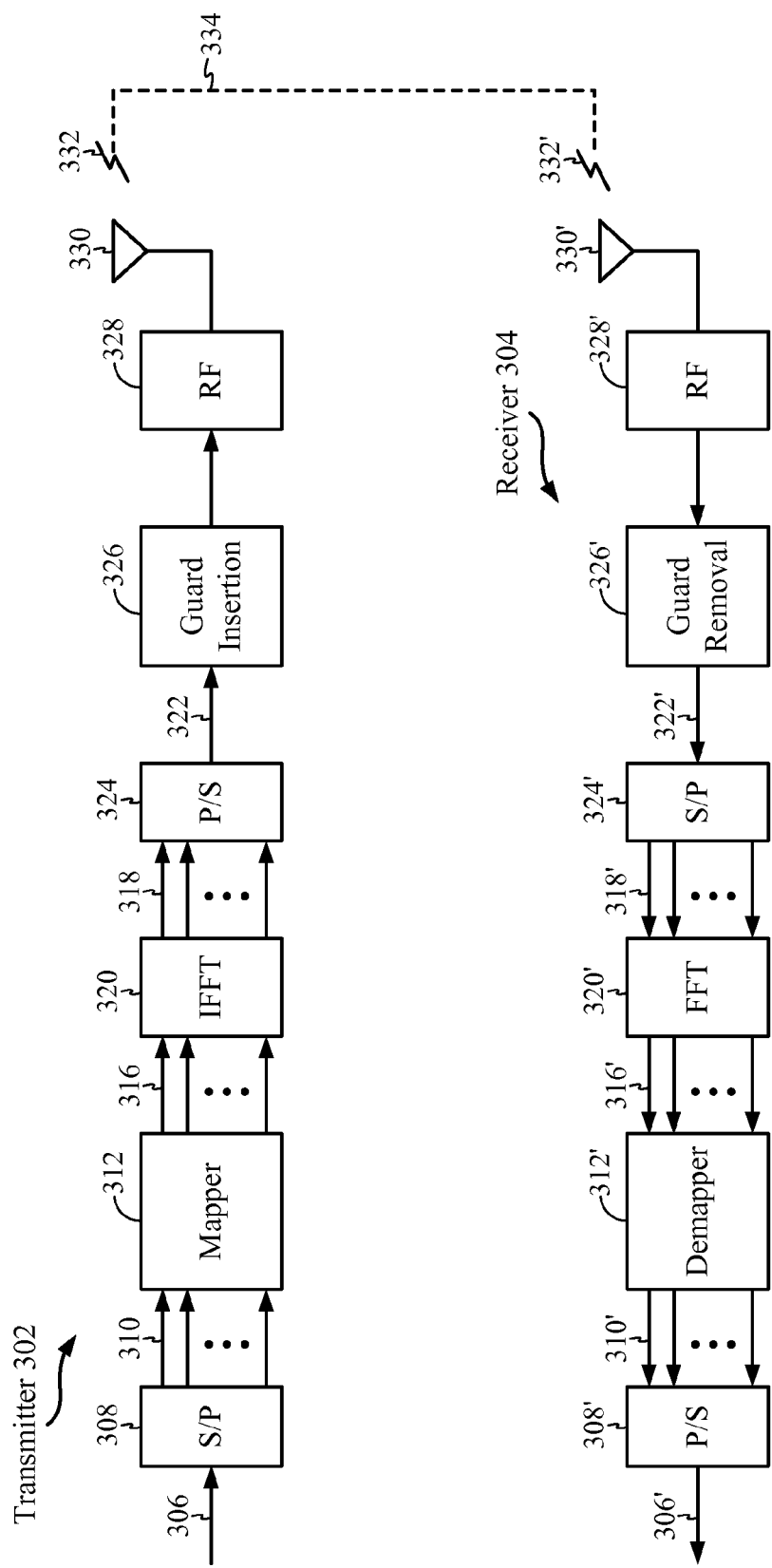
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8 PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$, (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary Broadcasting of DCD/UCD and MOB_NBR-ADV

In current versions of the IEEE 802.16 standard, the serving BS may broadcast a downlink map (DL-MAP) and an uplink map (UL-MAP) on a frame basis. The DL-MAP may describe the basic layout information for the DL data bursts inside the coming frame, while the UL-MAP may describe the basic layout information for the UL data bursts inside the coming frame. In order to decode the DL data bursts, an MS may need a current version of a downlink channel descriptor (DCD). Likewise, in order to properly encode the UL data bursts, an MS may need a current version of an uplink channel descriptor (UCD). Additionally, inside each DCD and UCD message as well as inside each DL-MAP and UL-MAP messages, there is a configuration change count (CCC). If the MS has received a DCD/UCD message with a CCC different from the CCC found within the DL-MAP/UL-MAP, then the MS may not decode the data bursts properly. As a result, the MS may lose all data packets transmitted before the DCD parameters and the DL-MAP information is synchronized, resulting in a drop in data throughput. Thus, it is important for the MS to receive a current version of the DCD and UCD messages.

The interval between any two consecutive DCD messages (or two consecutive UCD messages) can be up to 10 seconds. If the version of the DCD changes, resulting in the CCC incrementing, between two consecutive DCD/UCD messages and the MS is in an unavailable interval, the MS may miss the new version of the DCD/UCD message with the new CCC. Consequently, the MS may fail to decode the data bursts in frames in which the DL-MAP/UL-MAP are using the new CCC. Moreover, the MS may experience increased power consumption even if the traffic indication message is negative as the MS may wait for the reception of an updated DCD/UCD message before entering a sleep state.

Similarly, in order to perform a handover procedure effectively, the BS may broadcast the neighbor list to all the MSs via a mobile neighbor advertisement (MOB_NBR-ADV) message. Since the neighbor list can be large, multiple fragments of the MOB_NBR-ADV message may be required to transmit the entire list. To identify the fragments, the MOB_NBR-ADV message may contain a fragment index field and a total fragments field. Moreover, the neighbor list may need to be modified as a result of configuration changes of the neighbors or deployment changes. As a result, the MOB_NBR-ADV may also contain a CCC to identify the most up-to-date version of the neighbor list. If there is a version change to the MOB_NBR-ADV message, resulting in the CCC incrementing, when the MS is unavailable, the MS may miss a major neighbor list reconstruction fragment. In addition, the interval between two consecutive MOB_NBR-ADV messages may be as long as 30 seconds in contrast to the 10 seconds between any two consecutive DCD/UCD messages.

Moreover, a Service Identity Broadcast Information Advertisement (SII-ADV) message may contain a Network Service Provider (NSP) List corresponding to the BS. As with the DCD/UCD messages and the MOB_NBR-ADV messages, the NSP list may also be associated with a CCC that may be broadcast in the DCD message. A change in the NSP List CCC implies the NSP List has changed. In this case, the MS may need to re-evaluate whether the current BS is still a suitable BS through which to seek service.

As with the MOB_NBR-ADV message, the interval between two consecutive SII-ADV messages may be up to 30 seconds. However, the default period of the broadcast is 10 seconds. If a change in the NSP List CCC happens while the MS is unavailable, the MS may not have an up-to-date NSP List.

Figure 4A:
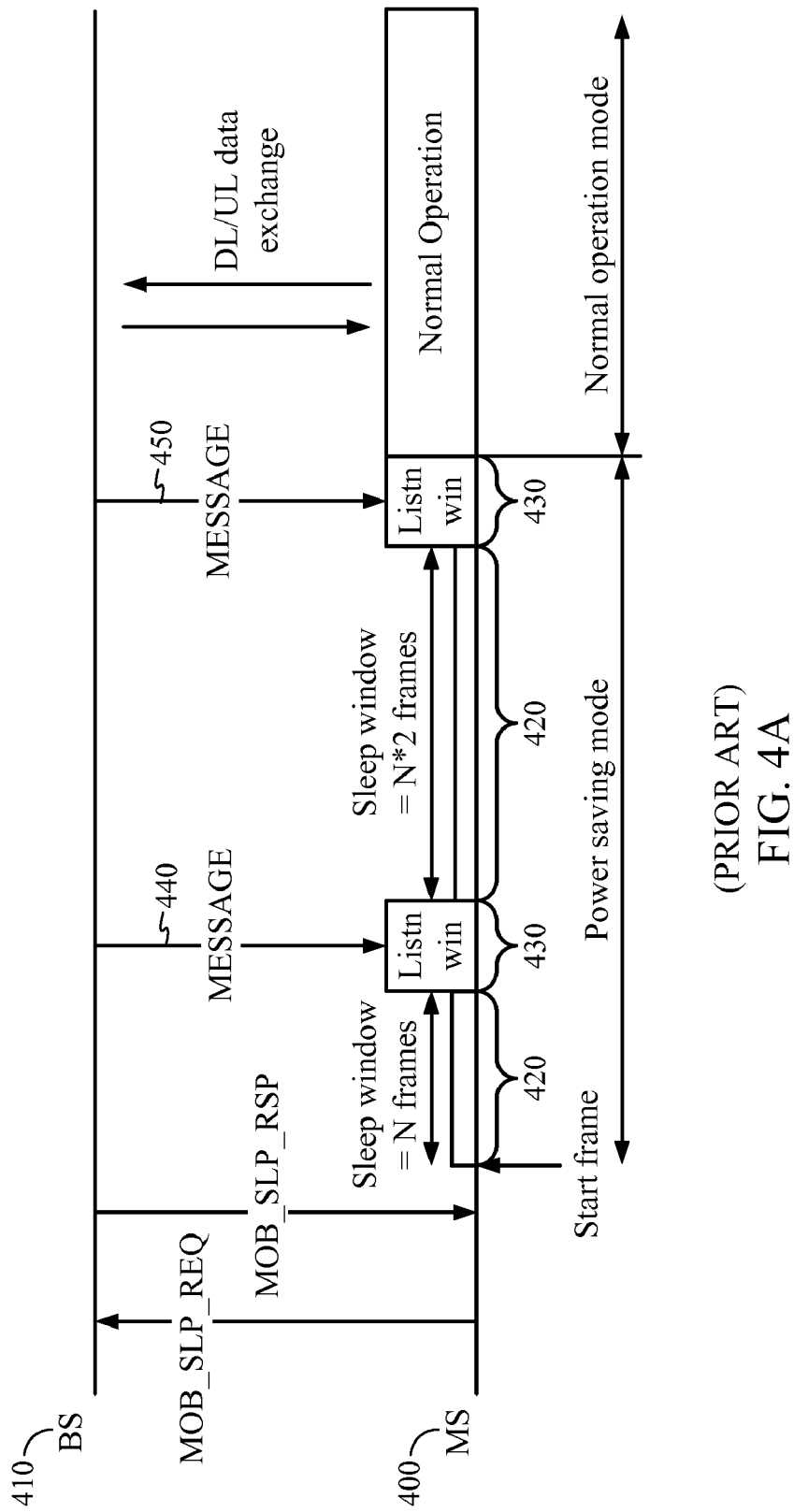
FIGS. 4A and 4B illustrate example exchanges between a base station (BS) and a mobile station (MS) in a power saving mode.

FIG. 4A illustrates example exchanges between a BS 410 and an MS 400 surrounding a period spent in a power saving mode. In the present example, the MS 400 is utilizing a power saving class (PSC) of type 1, which may be employed when the BS 410 and MS 400 share a best effort (BE) or non-real time variable rate (NRT-VR) connection.

As illustrated, the MS 400 may request to enter a sleep mode by sending a mobile sleep request (MOB_SLP-REQ) to the BS 410. In certain embodiments, the MS 400 may also utilize a Bandwidth (BW) request with a UL sleep control header to request a sleep mode. In response, the BS 410 may grant the sleep request by sending a mobile sleep response (MOB_SLP-RSP) to the MS 400. However, certain embodiments may employ a DL sleep control extended sub-header in granting the sleep request.

During the exchange of the sleep request and sleep response, the MS 400 and the BS 410 may establish a schedule of sleep windows 420 and listening windows 430 defined by a PSC. The MS 400 and BS 410 may select the PSC based on a quality of service (QoS) associated with the one or more connections employed. In certain embodiments, the selected PSC may be defined, activated or deactivated by one or more type, length, value (TLV) tuples transmitted in a range response (RNG-RSP) message.

During the scheduled listening windows 430, the MS 400 may wake up to listen for and receive MAC management messages from the BS 410. If the MAC management message indicates there is no action required 440 by the MS 400, the MS may return to sleep until the next scheduled listening interval. After receiving and decoding a MAC management message indicating action required 450 by the MS 400, the MS 400 may deactivate the PSC and begin a DL/UL data exchange with the BS 410.

Figure 4B:
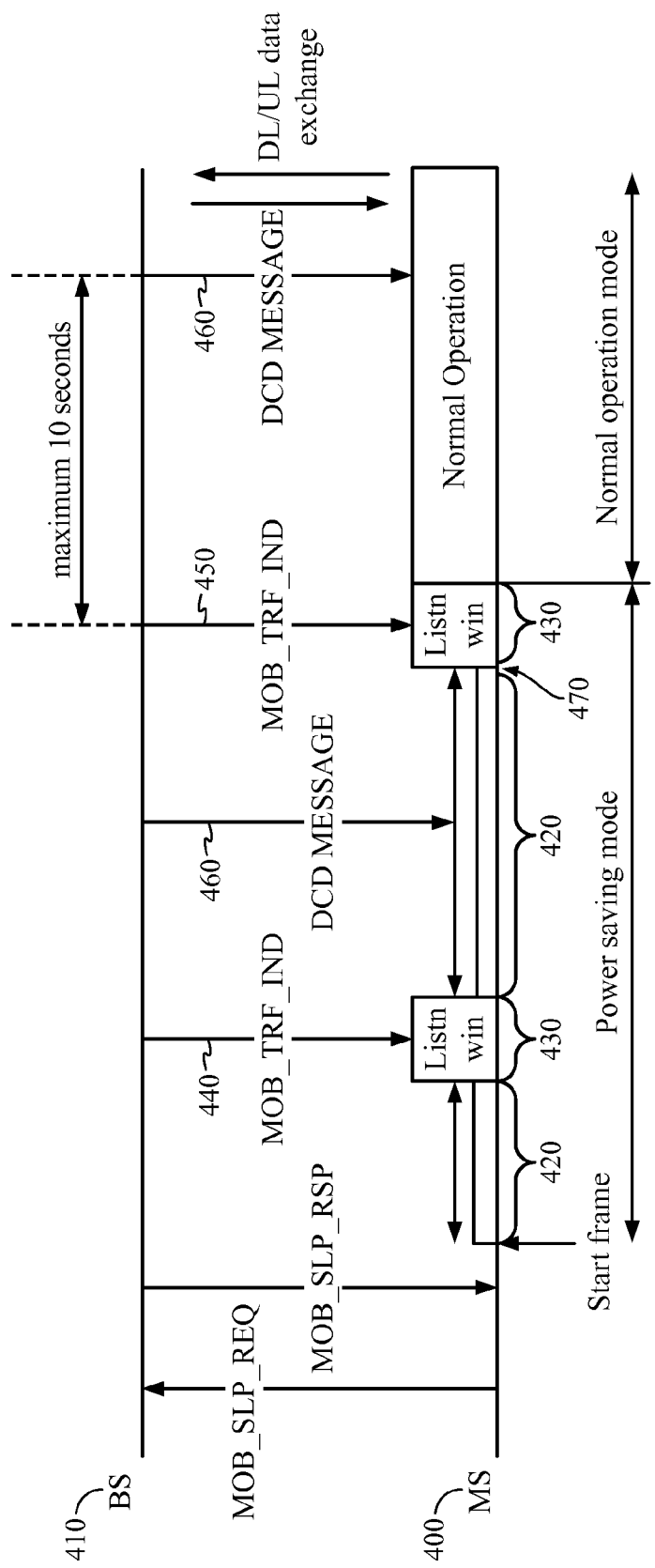

FIG. 4B illustrates example exchanges between a BS 410 and an MS 400 surrounding a period spent in a power saving mode. However, in certain instances, the BS 410 may send a MAC management message updating the certain parameters while the MS 400 is in a power savings mode. For example, the BS 410 may send a DCD message 460 to update the DCD parameters. If the DCD parameters are updated while the MS 400 is in a sleep window 420 of the power savings mode, the MS 400 may awaken to a mismatch 470 between the DCD parameters last received by the MS 400 and the DL-MAP information found in transmitted PDUs.

Consequently, the MS 400 may be unable to decode the PDUs. If the MS 400 is unable to decode the PDUs, the MS may discard subsequent PDUs until DCD parameters are updated and the MS 400 receives PDU messages with matching DL-MAP information. In some instances, data throughput may be delayed as long as 10 seconds before the BS 410 sends a DCD message 460 updating the DCD parameters. Moreover, even if the traffic indication message is negative, the MS 400 may experience increased power consumption as the MS 400 may wait for the reception of an updated DCD/UCD message before returning to a sleep state.

The 802.16e specification provides a mechanism to handle the aforementioned problem with the DCD/UCD message and the MOB_NBR-ADV message by using a broadcast control pointer information element (BCP-IE) in the DL-MAP. Using a BCP-IE, the MSs may be notified about the frame during which a DCD/UCD or MOB_NBR-ADV message will be sent. Additionally, the BCP-IE may contain a bit to indicate if MOB_NBR-ADV broadcast information is included in the element and the frame number of the broadcast.

Although the BCP-IE may provide the MS with the timing of DCD/UCD and MOB_NBR-ADV messages, receiving it may require the MS to wake-up from a low power state if the broadcast frame lies within an unavailable window. In addition, the CCC (i.e., the version) of the DCD/UCD message sent during the indicated frame may not have changed. Similarly, the BCP-IE does not indicate the CCC (i.e., the version) of the MOB_NBR-ADV nor the fragment of the neighbor list that will be sent. In both cases, the MS may wake-up unnecessarily to receive these MAC management messages that have already been received. This wake-up may waste MS power.

Moreover, the BCP-IE does not provide any information on broadcast schedule of SII-ADV messages. Thus, once the NSP CCC in DCD has changed, the MS may be required to stay awake until the next SII-ADV broadcast. This implies an average of 5 second to 15 seconds of wait time in which the MS could have been in sleep mode if the broadcast schedule of SII-ADV had been known.

Accordingly, certain embodiments of the present disclosure may provide a method and apparatus for detecting a mismatch between a set of one or more MAC management message parameters (e.g., DCD/UCD, MOB_NBR-ADV, and SII-ADV parameters) last received by the MS and the information found in an enhanced BCP-IE transmitted in a protocol data unit (PDU) and altering a schedule of a sleep mode based, at least, on the information found in the enhanced BCP-IE to wake-up and receive the MAC management message.

Figure 5:
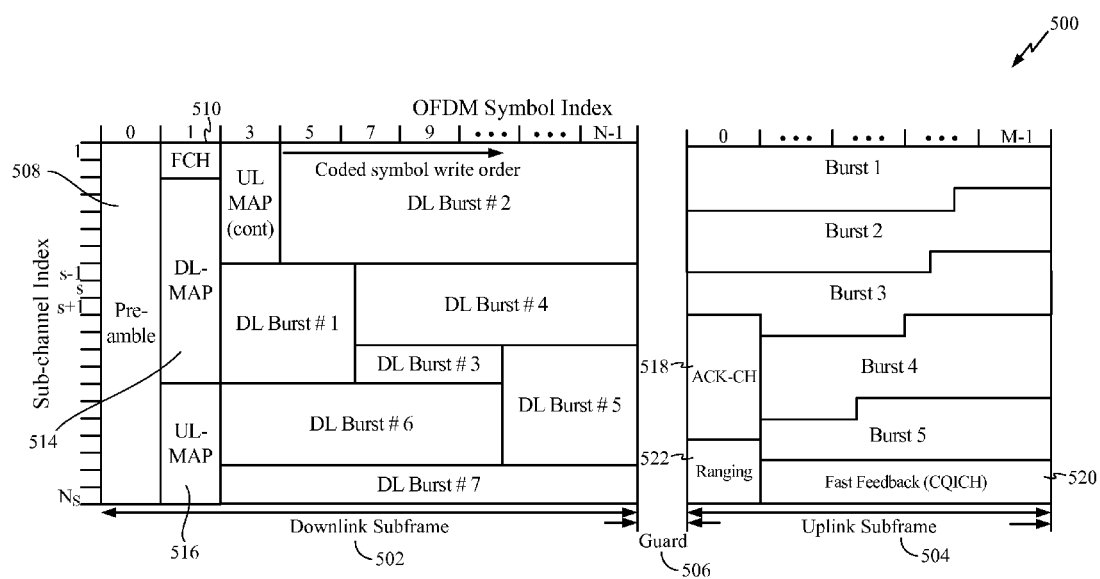
FIG. 5 illustrates an example OFDM/OFDMA frame for Time Division Duplex (TDD).

Referring now to FIG. 5, an OFDM/OFDMA frame 500 for a Time Division Duplex (TDD) implementation is depicted as a typical, but not limiting, example. Other implementations of an OFDM/OFDMA frame, such as Full and Half-Duplex Frequency Division Duplex (FDD) may be used, in which case the frame may have a similar structure, except that both downlink (DL) and uplink (UL) messages may be transmitted simultaneously over different carriers. In the TDD implementation, each frame may be divided into a DL sub-frame 502 and a UL sub-frame 504, which may be separated by a small guard interval 506. As illustrated, the DL and UL sub-frames 502, 504 may be separated by Transmit/Receive and Receive/Transmit Transition Gaps (TTG and RTG, respectively) in an effort to prevent DL and UL transmission collisions. The DL-to-UL sub-frame ratio may be varied from 3:1 to 1:1 to support different traffic profiles.

Within the OFDM/OFDMA frame 500, various control information may be included. For example, the first OFDM/OFDMA symbol of the frame 500 may be a preamble 508, which may contain several pilot signals (pilots) used for synchronization. Fixed pilot sequences inside the preamble 508 may allow the receiver 304 to estimate frequency and phase errors and to synchronize to the transmitter 302. Moreover, fixed pilot sequences in the preamble 508 may be utilized to estimate and equalize wireless channels. The preamble 508 may contain BPSK-modulated carriers and is typically one OFDM symbol long. The carriers of the preamble 508 may be power boosted and are typically a few decibels (dB) (e.g., 9 dB) higher than the power level in the frequency domain of data portions in the WiMAX signal. The number of preamble carriers used may indicate which of the three segments of the zone are used. For example, carriers 0, 3, 6, . . . may indicate that segment 0 is to be used, carriers 1, 4, 7, . . . may indicate that segment 1 is to be used, and carriers 2, 5, 8, . . . may indicate that segment 2 is to be used.

A Frame Control Header (FCH) 510 may follow the preamble 508. The FCH 510 may provide frame configuration information, such as the usable sub-channels, the modulation and coding scheme, and the MAP message length for the current OFDM/OFDMA frame.

Following the FCH 510, a DL-MAP 514 and a UL-MAP 516 may specify data burst allocation and other control information for the DL and UL sub-frames 502, 504. In the case of OFDMA, multiple users may be allocated data regions within the frame, and these allocations may be specified in the DL and UL-MAP messages 514, 516. The MAP messages may include the burst profile for each user, which defines the modulation and coding scheme used in a particular link. Since MAP messages contain critical information that needs to reach all users, the DL and UL-MAP messages 514, 516 may often be sent over a very reliable link, such as BPSK or QPSK with rate 1/2 coding and repetition coding. The DL sub-frame 502 of the OFDM/OFDMA frame may include DL bursts of various bit lengths containing the downlink data being communicated. Thus, the DL-MAP 514 may describe the location of the bursts contained in the downlink zones and the number of downlink bursts, as well as their offsets and lengths in both the time (i.e., symbol) and the frequency (i.e., sub-channel) directions.

Likewise, the UL sub-frame 504 may include UL bursts of various bit lengths composed of the uplink data being communicated. Therefore, the UL-MAP 516, transmitted as the first burst in the downlink sub-frame 502, may contain information about the location of the UL burst for different users. The UL sub-frame 504 may include additional control information. The UL sub-frame 504 may include a UL ACK 518 allocated for the mobile station (MS) to feed back a DL hybrid automatic repeat request acknowledge (HARQ ACK) and/or a UL CQICH 520 allocated for the MS to feed back channel quality information on the Channel Quality Indicator channel (CQICH). Furthermore, the UL sub-frame 504 may comprise a UL Ranging sub-channel 522. The UL Ranging sub-channel 522 may be allocated for the MS to perform closed-loop time, frequency, and power adjustment, as well as bandwidth requests. Altogether, the preamble 508, the FCH 510, the DL-MAP 514 and the UL-MAP 516 may carry information that enables the receiver 304 to correctly demodulate the received signal.

For OFDMA, different "modes" can be used for transmission in DL and UL. An area in the time domain where a certain mode is used is generally referred to as a zone. One type of zone is called DL-PUSC (downlink partial usage of subchannels) and may not use all the subchannels available to it (i.e., a DL-PUSC zone may only use particular groups of subchannels). There may be a total of six subchannel groups, which can be assigned to up to three segments. Thus, a segment can contain one to six subchannel groups (e.g., segment 0 contains the first two subchannel groups, segment 1 contains the next two and segment 2 contains the last two subchannel groups). Another type of zone is called DL-FUSC (downlink full usage of subchannels). Unlike DL-PUSC, DL-FUSC does not use any segments, but can distribute all bursts over the complete frequency range.

Exemplary DL-MAP and BCP-IE

Figure 6A:
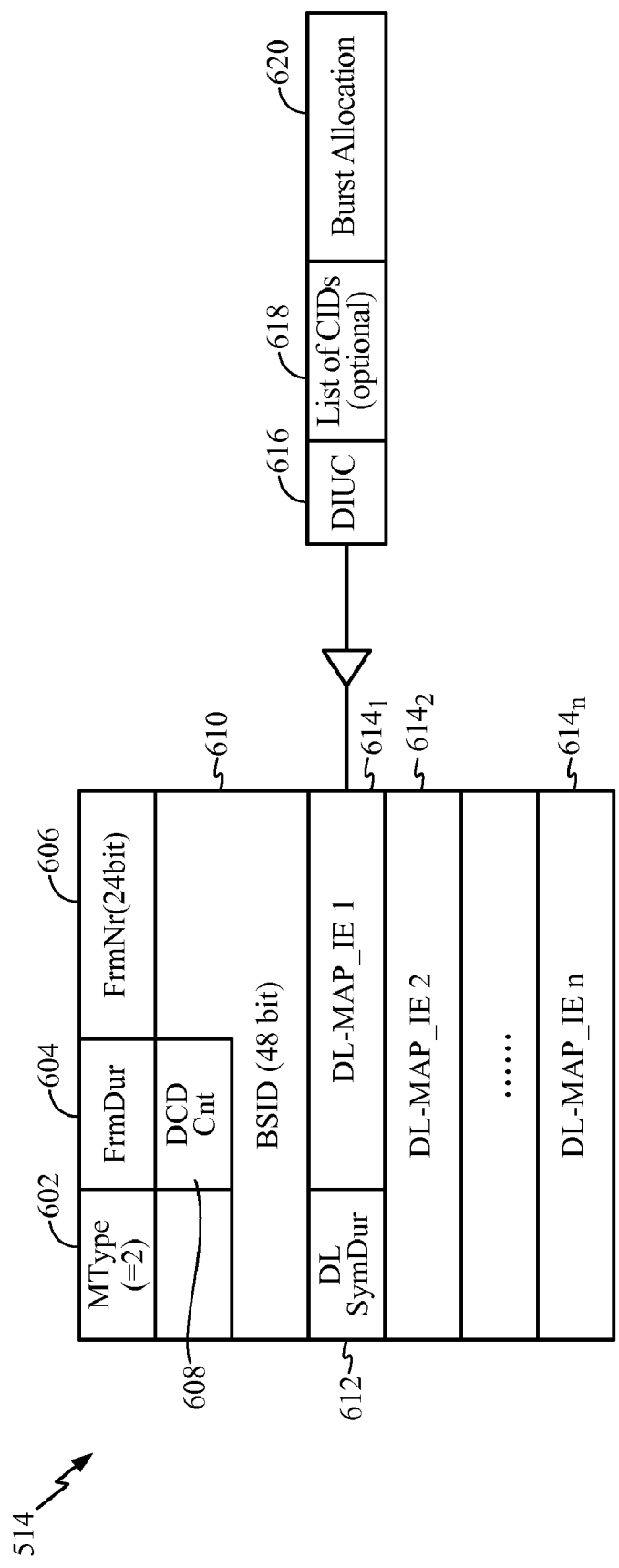

The DL-MAP 514 of FIG. 5, according to certain embodiments, is illustrated in more detail in FIG. 6A with FIG. 6B illustrating the format of and the bit size of entries in a BCP-IE.

The DL-MAP 514 may begin with a Management Message Type 602 having a length of 8 bits, which has a value of 2 ($00000010_b$) to indicate the control message is a DL-MAP. In the illustrated example, the Management Message Type 602 may be followed by a frame duration code 604, which is 8 bits long, and a frame number 606, which is 24 bits long. The frame number 606 may be followed by a Downlink Channel Descriptor (DCD) count 608 having a length of 8 bits and matching the DCD CCC value. The DCD message refers to physical and Media Access Control (MAC) layer-related parameters to be applied to the downlink channel configuration of the sector. The DCD count 608 may be followed by a base station identifier (BSID) 610, having a length of 6 bytes (48 bits). The BSID 610 may uniquely identify the base station in the network and may be followed by a DL symbol duration 612 indicating a number of OFDMA symbols in the DL sub-frame 502 and having a length of 8 bits.

A number (n) of DL-MAP information elements (IEs) 614 having variable lengths may follow the DL symbol duration 612. A generic DL-MAP IE 614 may comprise a Downlink Interval Usage Code (DIUC) 616, a list of connection IDs 618, and the DL burst allocation 620 (e.g., sub-channel offset, symbol offset, sub-channel number, and symbol number) to define a downlink transmission. A DIUC 616 between 0 and 12 inclusive may indicate that the DL-MAP IE provides a DL burst profile (i.e., the modulation and coding scheme used in the burst), while a DIUC 616 of 14 or 15 may indicate that the DL-MAP IE is a control information element, for example a BCP-IE as illustrated in FIG. 6B. A DIUC 616 of 13 may indicate that the DL-MAP IE is used for safety zones (i.e., gap) and peak-to-average-power ratio (PAPR) reduction. Although not shown in FIG. 6A, some embodiments of the DL-MAP 514 may include padding having a length of 4 bits in an effort to reach a byte boundary for the DL-MAP 514.

Exemplary Alerting DCD/UCD and MOB_NBR-ADV Broadcasting

Figure 7:
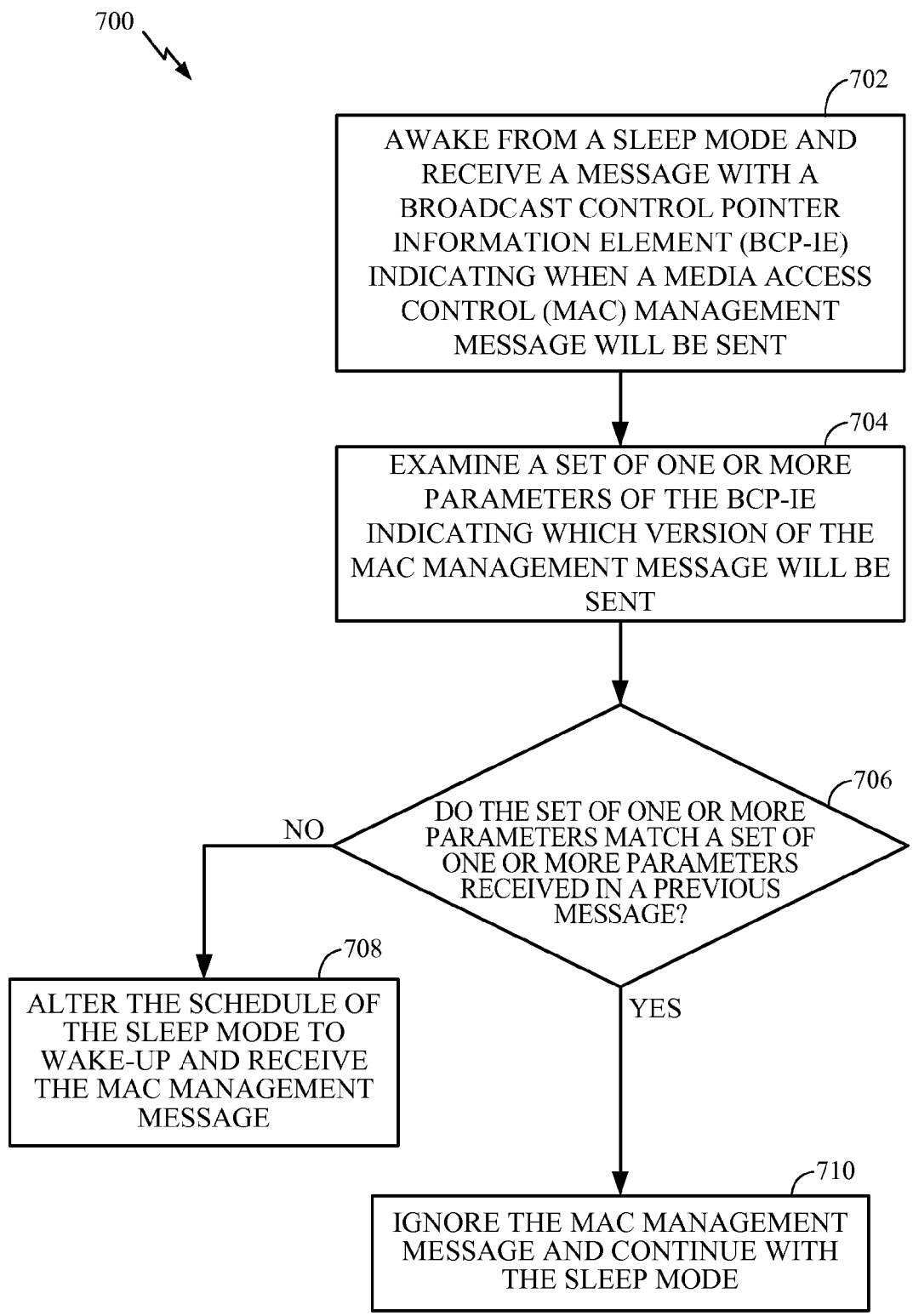
FIG. 7 illustrates example operations for alerting a MS to prepare to receive a media access control (MAC) management message the MS has not yet received.

FIG. 7 illustrates example operations 700 which may be performed, for example by an MS, for detecting a mismatch between a set of one or more MAC management message parameters last received by the MS and the information found in an enhanced BCP-IE transmitted in a protocol data unit (PDU) and altering a schedule of a sleep mode based, at least, on the information found in an enhanced BCP-IE to wake-up and receive the MAC management message.

Operations begin, at 702, with an MS awaking from a sleep mode and receiving a first message with a BCP-IE indicating when a MAC management message will be sent. For example, the BCP-IE may indicate when a DCD/UCD, MOB_NBR-ADV or SII-ADV message will be sent. In certain instances, the first message may be received prior to the MS entering a sleep mode. In other instances, the MS may receive the first message during a listening window of the sleep mode. Additionally, the first message may be a MAC management message or any other type of message since the BCP-IE may be located in the DL-MAP which is included in the DL sub-frame of each frame.

At 704, the MS may examine a set of one or more parameters of the BCP-IE indicating which MAC management message and which version of said message will be sent. For example, the MS may examine the CCC value when dealing with DCD/UCD or SII-ADV message, while the MS may examine the CCC value, the fragment index and the total number of fragments when the BCP-IE indicates a pending MOB_NBR-ADV message.

At 706, the MS may determine if the set of one or more parameters of the BCP-IE match a set of one or more parameters received in a previous message. If the set of one or more parameters of the BCP-IE matches the set of one or more parameters received in a previous message, the version of the MAC management message that is to be sent may have been received previously. Accordingly, the MS may ignore the MAC management message that is to be sent and continue with the sleep mode at 710.

In contrast, if the set of one or more parameters of the BCP-IE does not match the set of one or more parameters received in a previous message, the MS may not have received the version of the MAC management message that is to be sent. Accordingly, the MS, at 708, may refer to the transmission frame of the BCP-IE and alter the schedule of the sleep mode so as to wake-up and receive the new version of the MAC management message when it is sent.

Figure 8:
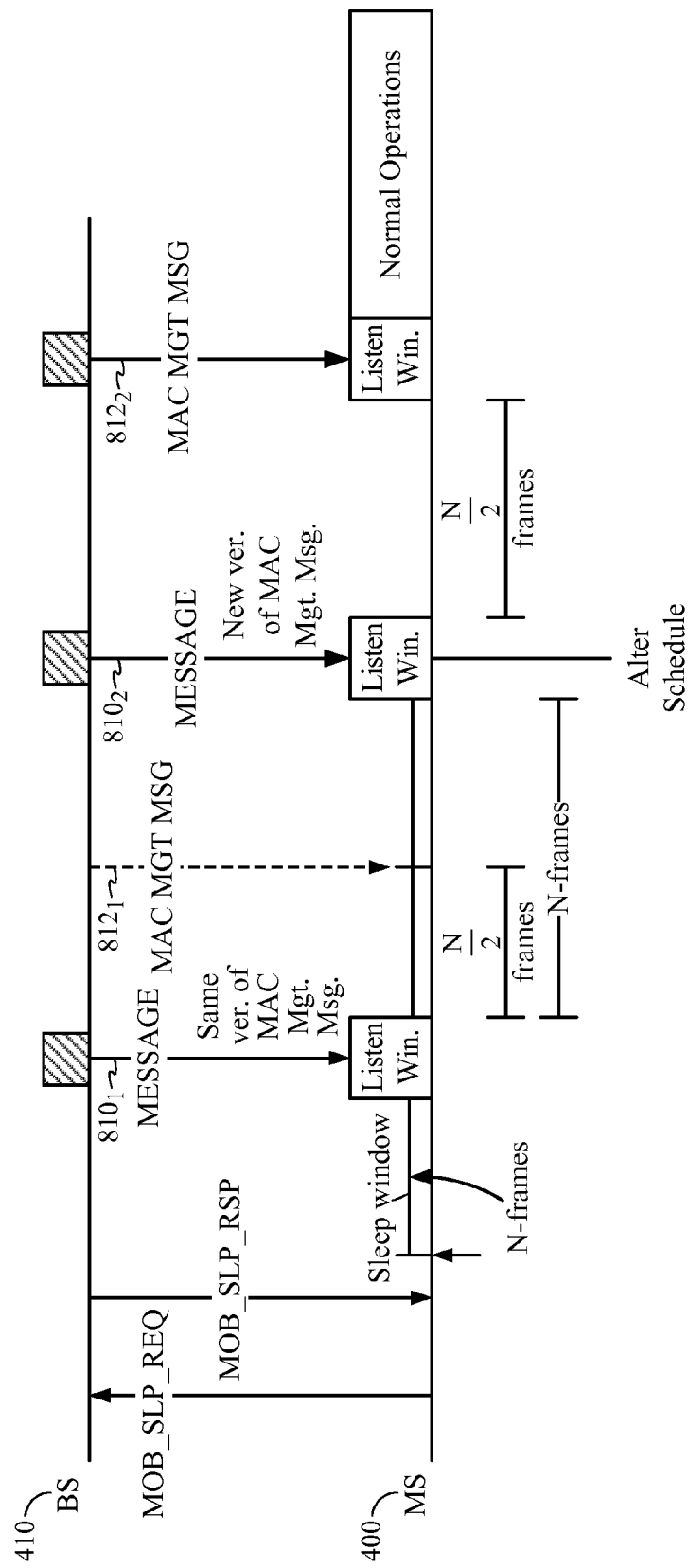
FIG. 8 illustrates example exchanges between a BS and a MS, wherein the BS alerts the MS to prepare to receive a MAC management message the MS has not yet received.

FIG. 8 illustrates example exchanges between a BS 410 and an MS 400 implementing embodiments of the present disclosure. For example, upon receiving a first message $810_1$ the MS may decide to ignore the next MAC management message $812_1$ and return to the sleep mode for N frames. In this case, the CCC of the BCP-IE of the DL-MAP of the first message $810_1$ may indicate that the next MAC management message $812_1$ may have the same version of MAC management message as was previously received by the MS 400. The MS 400 may then enter another listening window and receive a second message $810_2$ indicating the next MAC management message $812_2$ may have a new version of the MAC management message. Accordingly, the MS 400 may alter the schedule of the sleep mode to awake early (e.g., after N/2 frames) so as to receive the new version of the MAC management message $812_2$ when it is sent. After decoding the MAC management message $812_2$, the MS 400 may exit the sleep mode and begin normal operations in accordance with the instructions of the MAC management message $812_2$. For other embodiments, after decoding the MAC management message $812_2$, the MS 400 may re-enter the sleep mode until the next scheduled wake up time, which may yield significant power savings and/or bandwidth savings.

Exemplary Synchronization for DCD/UCD and MOB_NBR-ADV Broadcasting

According to certain embodiments, the BS 410 may be able to determine whether a version of a MAC management message last received by the MS 400 matches the DL-MAP information currently being sent by the BS 410. By tracking the availability of the MS 400 and scheduling the transmission of MAC management messages during intervals in which some or all of the MSs are available, the BS 410 may ensure each MS 400 receives the current version of the MAC management message. When the BS 410 is confident each MS has received the current version of the MAC management message, the BS 410 may reconfigure the MAC management message as necessary, resulting in an increased CCC, or continue to broadcast in accordance with the current version of the MAC management message using the longest allowable delay between reconfigurations.

Figure 9:
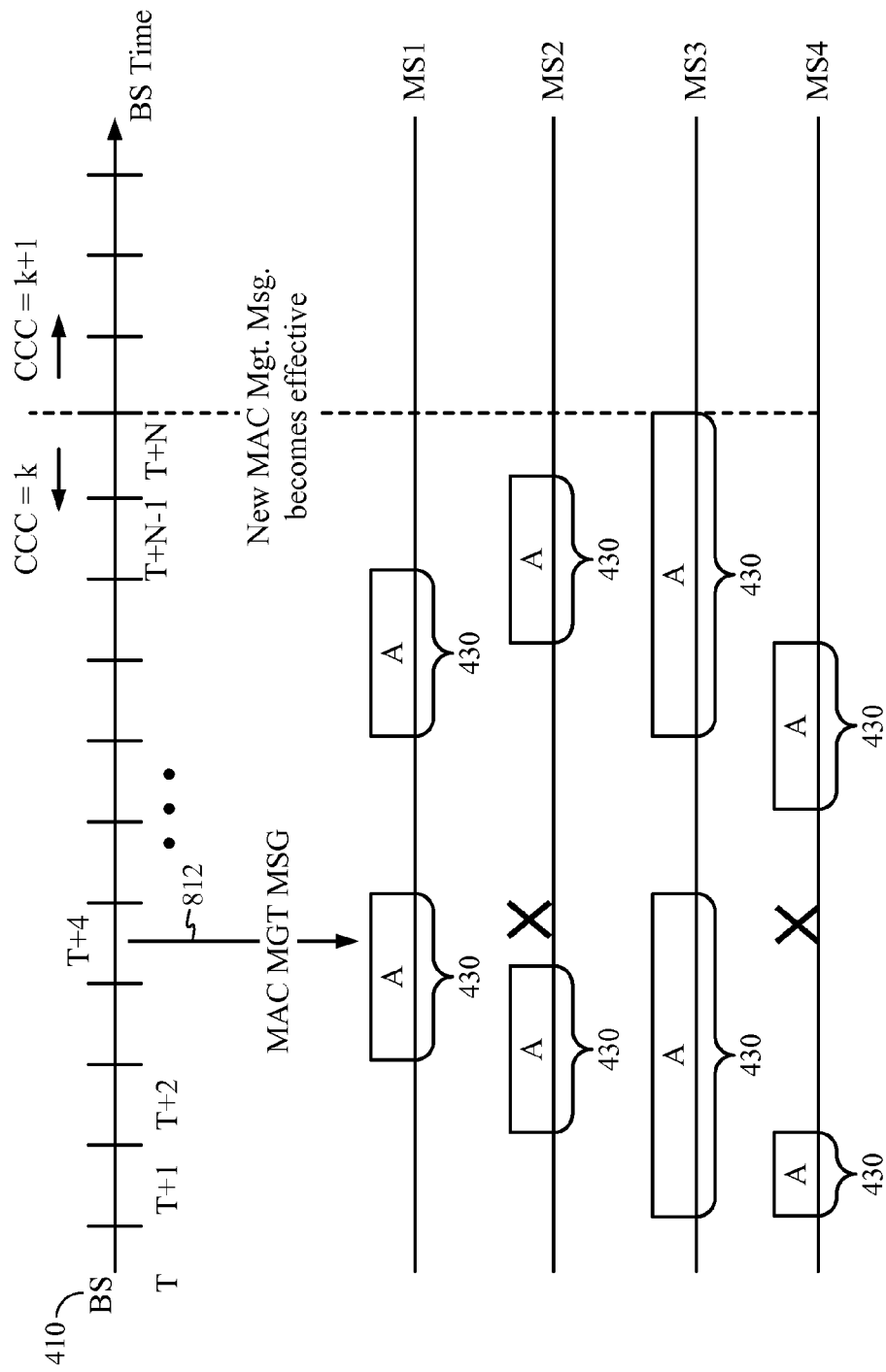
FIG. 9 illustrates a MAC management message being sent to a plurality of MSs in various power saving modes.

FIG. 9 illustrates a DCD message being sent to a plurality of MSs in various power saving modes. After determining that a new MAC management message is going to take effect, the BS may determine that the new MAC management message needs to be sent within the subsequent N frames from the present frame T. However, when the BS broadcasts the new version of the MAC management message 812, some MSs may be unavailable and may miss the new MAC management message. For example, one or more MSs may be in a sleep, idle, or scanning interval, as illustrated with $MS_2$ and $MS_4$. If the MSs do not receive the new MAC management message 812 before the new version becomes effective, the MSs may suspend corresponding operations (i.e., service may be disrupted) until a new version of the MAC management message is acquired.

Accordingly, certain embodiments of the present disclosure provide a method and apparatus for ensuring each MS serviced by the BS does not miss a new version of a MAC management message before the new version takes effect. For example, embodiments may determine a set of frames during which each MS is awake and send the new version of the MAC management message during one or more of the frames of the set of frames.

Figure 10:
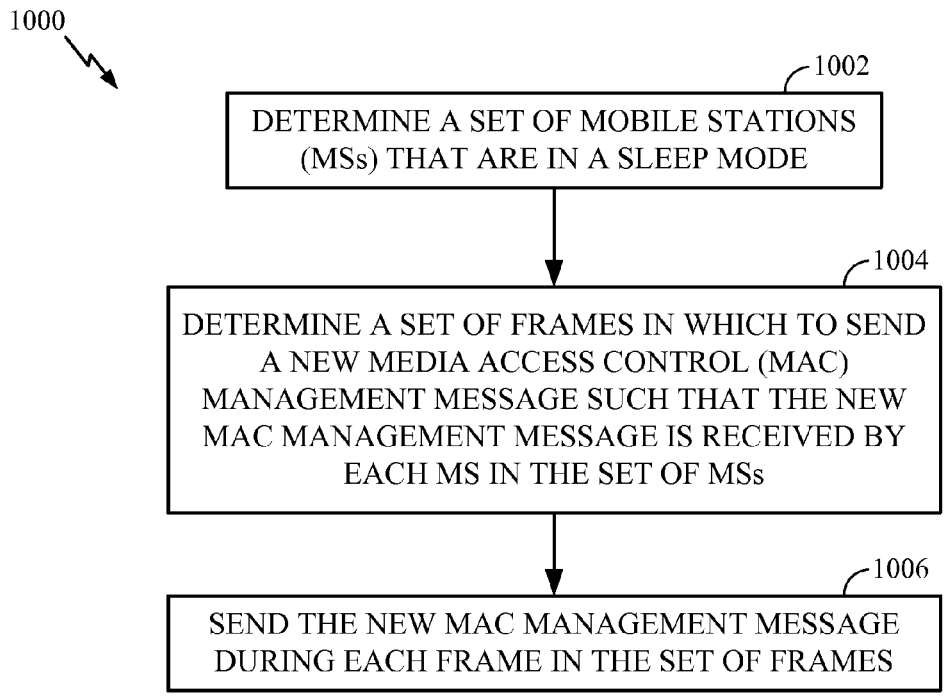
FIG. 10 illustrates example operations that may be performed, for example, by a serving BS, for sending a new MAC management message such that each MS in a set of MSs receives the new message.

FIG. 10 illustrates example operations 1000 which may be performed, for example by a BS, for scheduling the transmission of the current version of the MAC management message during a set of frames so as to ensure each MS serviced by the BS receives the current version of the message.

Operations begin, at 1002, with the BS determining a set of MSs that are in a sleep mode. If an MS 400 is not in a sleep mode, then the MS 400 may be expected to be instantly available. Accordingly, MSs serviced by the BS which are not in the sleep mode may receive the current version of the MAC management message whenever it is sent by the BS.

At 1004, the BS may determine a set of frames in which to send a new version of the MAC management message such that the new version is received by each MS in the set of MSs. According to certain embodiments, the BSs may attempt to determine the smallest set of frames possible in which to send a new version of the MAC management message such that the new version is received by each MS in the set of MSs. In some embodiments, BSs might determine the smallest set of frames possible and/or practical in which to send a new MAC management message so that after the BSs are confident that some or all of the MSs have received the current version of the MAC management message, the BS may reconfigure the MAC management message as necessary, resulting in an increased configuration change counter (CCC). Some embodiments may apply a heuristic algorithm to determine the set of frames and/or the smallest set of frames. At 1006, the BS may send the new version of the MAC management message during each frame in the set of frames.

Figure 11:
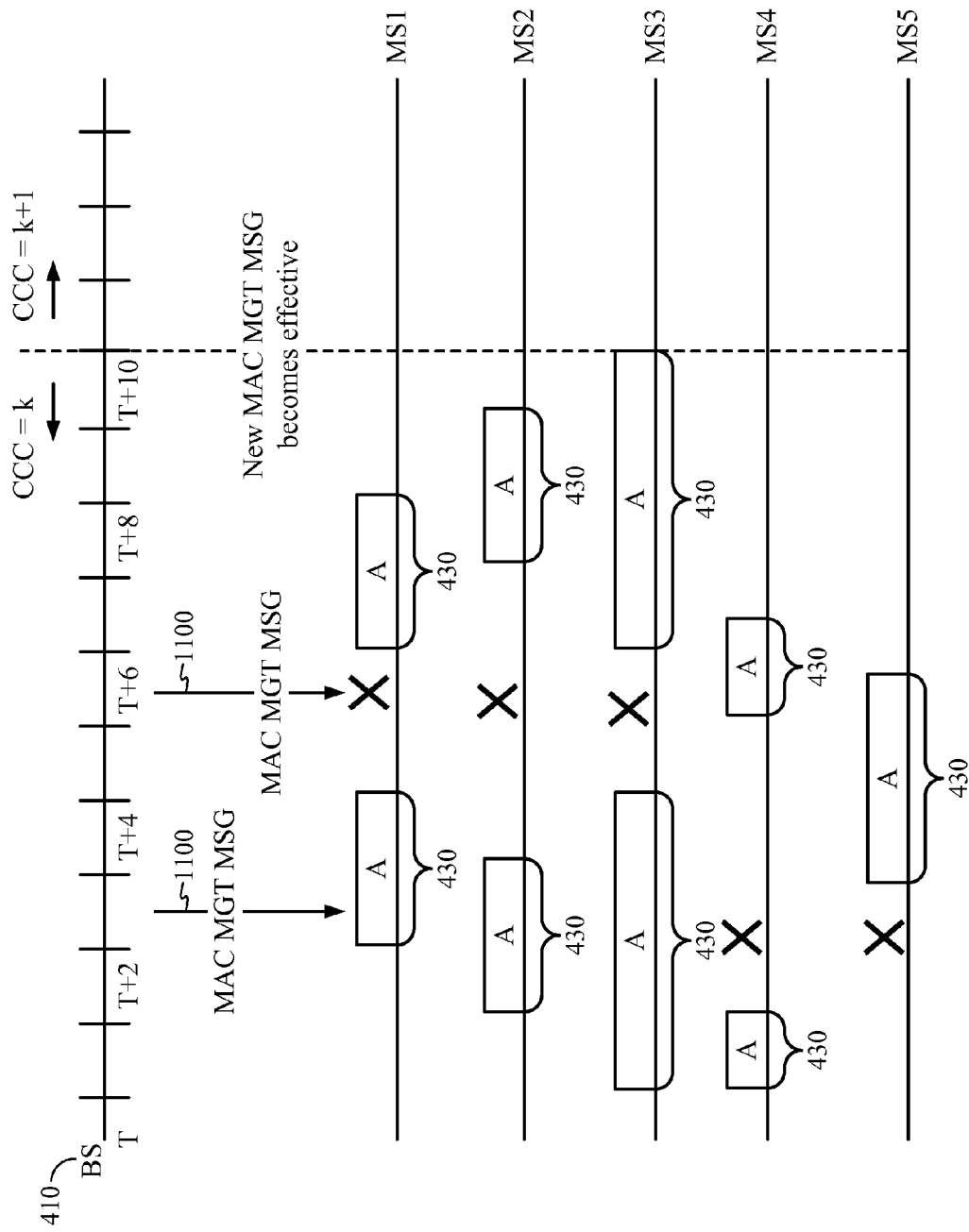
FIG. 11 illustrates a new MAC management message sent until each MS in a set of MSs receives the message.

FIG. 11 illustrates the BS 410 sending the new MAC management message 1100 during frames T+3 and T+6. If the BS 410 sent the new MAC management message 1100 during frame T+3, MSs1-3 would be in an available interval 430 and would receive the new MAC management message 1100. However, MSs4-5 would not receive the new MAC management message 1100. However, when the BS sent the new MAC management message 1100 a second time, during frame T+6, MSs4-5 would be in an available interval 430 and would receive the new MAC management message 1100. Consequently, each MS in the set of MSs would receive the new MAC management message 1100 before the new message took effect after frame 10.

Though the previously described embodiments are explained with reference to an MS in a sleep mode, implementations may be extended to an MS in a scanning or idle mode. When used with an MS in a scanning mode, embodiments may avoid unnecessary interrupt to the scan schedule. This may result in a higher return in terms of neighbor BS information per scan iteration, which may yield better data sets for performing handover decisions.

Figure 7A:
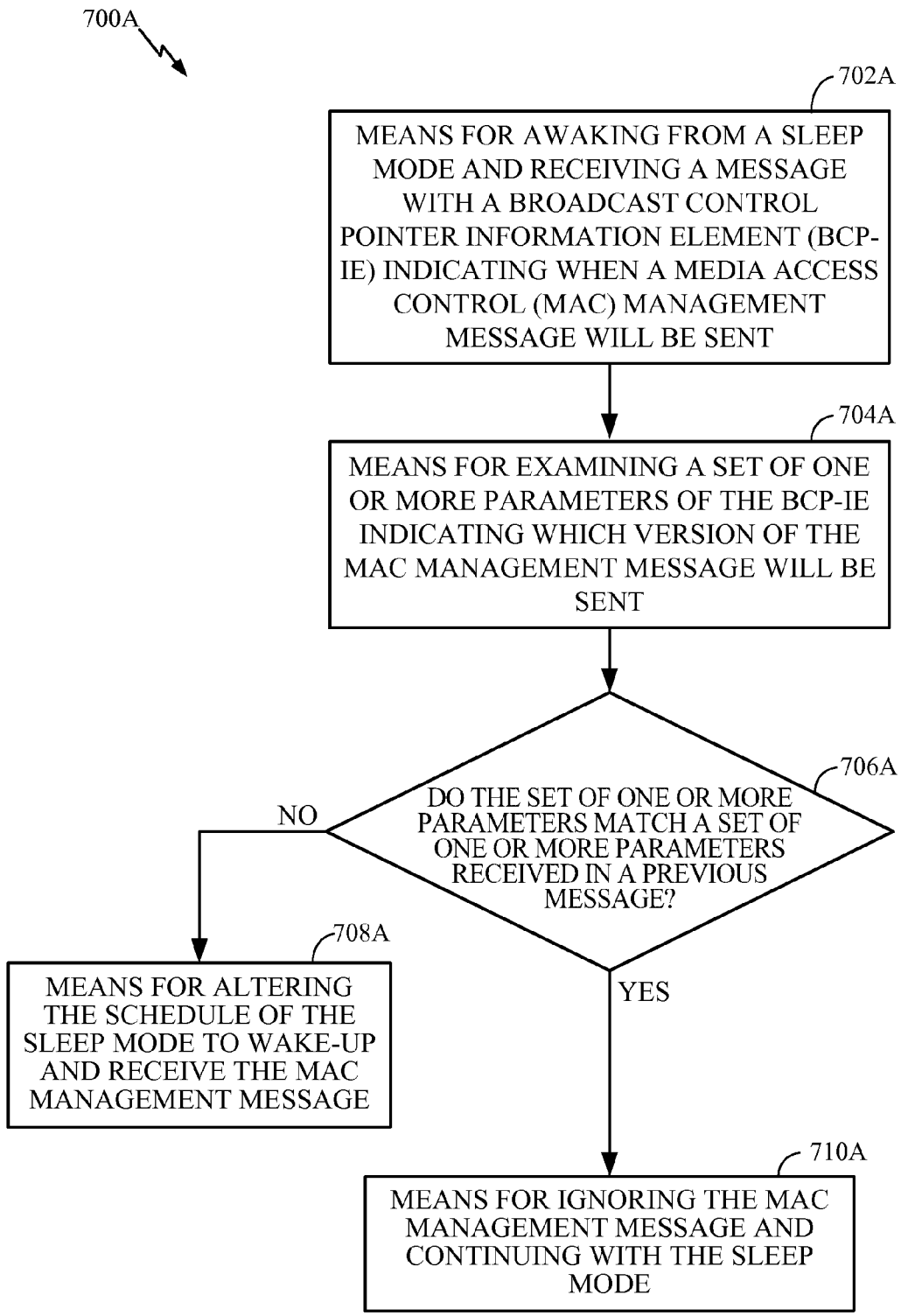
FIG. 7A illustrates example components capable of performing the example operations of FIG. 7.
Figure 10A:
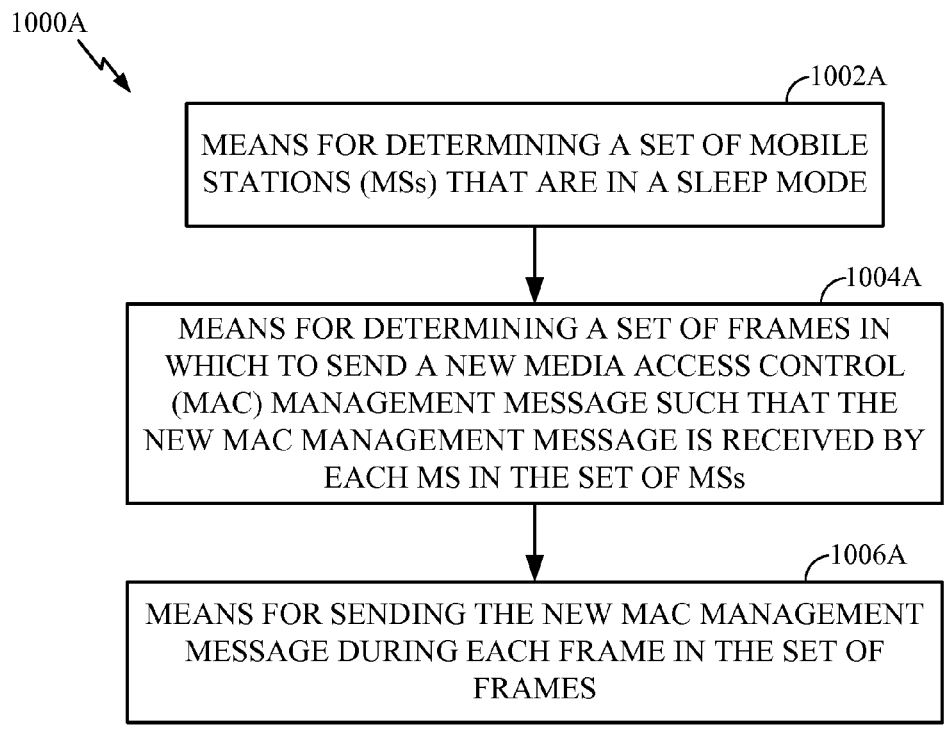
FIG. 10A illustrates example components capable of performing the example operations of FIG. 10.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 702-710 illustrated in FIG. 7 correspond to means-plus-function blocks 702A-710A illustrated in FIG. 7A. Similarly, blocks 1002-1006 illustrated in FIG. 10 correspond to means-plus-function blocks 1002A-1006A illustrated in FIG. 10A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium, or memory device. A storage media may be any available media that can be accessed by a computer. By way of example, and not limitation, such computer-readable media or storage device can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium, for example, from on storage device to another storage device. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD), floppy disk or other magnetic, optic or organic storage media, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method for wireless communications, comprising:
   receiving, at a mobile station during a listening interval of a low power state, a message with a broadcast control pointer information element (BCP-IE) indicating when a media access control (MAC) management message will be sent, the MAC management message being a service identity broadcast information advertisement (SII-ADV) message;
   determining if a version of the MAC management message to be sent matches a previously received version of the MAC management message; and
   altering, at the mobile station, a schedule of the low power state to wake-up and receive the MAC management message in response to the version of the MAC management message to be sent not matching the previously received version.

2. The method of claim 1, wherein determining if the version of the MAC management message to be sent matches the previously received version of the MAC management message, comprises:
   examining a set of one or more parameters of the BCP-IE indicating which version of the MAC management message will be sent.

3. The method of claim 2, wherein the set of one or more parameters of the BCP-IE comprises a configuration change counter (CCC), a fragment index, or a total number of fragments value.

4. A method for wireless communications via orthogonal frequency-division multiplexing (OFDM) or orthogonal frequency division multiple access (OFDMA), comprising:
   determining, at a base station, a set of one or more mobile stations (MSs) that are in an unavailable state;
   determining, at the base station, a set of frames in which to send a new media access control (MAC) management message such that the new MAC management message is received by each MS in the set of MSs prior to the new MAC management message taking effect; and
   transmitting, from the base station, the new MAC management message during each frame in the set of frames.

5. The method of claim 4, wherein determining the set of frames in which to send the new MAC management message comprises:
   selecting the set of frames such that the set of frames is a smallest set of frames, while the new MAC management message is received by each MS in the set of MSs.

6. The method of claim 4, wherein determining the set of frames in which to send the new MAC management message comprises implementing a heuristic algorithm to determine the set of frames.

7. A mobile station for wireless communications, comprising:
   a processor;
   memory in electronic communication with the processor; and
   instructions stored in the memory and executable by the processor to:
      receive, during a listening interval of a low power state, a message with a broadcast control pointer information element (BCP-IE) indicating when a media access control (MAC) management message will be sent, the MAC management message being a service identity broadcast information advertisement (SII-ADV) message;

determine a version of the MAC management message to be sent matches a previously received version of the MAC management message; and altering a schedule of the low power state to wake-up and receive the MAC management message in response to the version of the MAC management message to be sent not matching the previously received version.

8. The mobile station of claim 7, wherein
the instructions are executable by the processor to analyze a set of one or more parameters of the BCP-IE indicating which version of the MAC management message will be sent.

9. The mobile station of claim 8, wherein the set of one or more parameters of the BCP-IE comprises a configuration change counter (CCC), a fragment index, or a total number of fragments value.

10. A base station for wireless communications via orthogonal frequency-division multiplexing (OFDM) or orthogonal frequency division multiple access (OFDMA), comprising:
a processor;
memory in electronic communication with the processor; and
instructions stored in the memory and executable by the processor to:
determine a set of one or more mobile stations (MSs) that are in an unavailable state;
determine a set of frames in which to send a new media access control (MAC) management message such that the new MAC management message is received by each MS in the set of MSs prior to the new MAC management message taking effect; and
transmit the new MAC management message during each frame in the set of frames.

11. The base station of claim 10, wherein
the instructions are executable by the processor to select the set of frames such that the set of frames is a smallest set of frames, while the new MAC management message is received by each MS in the set of MSs.

12. The base station of claim 10, wherein the instructions are executable by the processor to implement a heuristic algorithm to determine the set of frames.

13. A mobile station for wireless communications, comprising:
means for receiving, during a listening interval of a low power state, a message with a broadcast control pointer information element (BCP-IE) indicating when a media access control (MAC) management message will be sent, the MAC management message being a service identity broadcast information advertisement (SII-ADV) message;
means for determining if a version of the MAC management message to be sent matches a previously received version of the MAC management message; and
means for altering a schedule of the low power state to wake-up and receive the MAC management message in response to the version of the MAC management message to be sent not matching the previously received version.

14. The mobile station of claim 13, wherein the means for determining if the version of the MAC management message to be sent matches the previously received version of the MAC management message, comprises:
means for examining a set of one or more parameters of the BCP-IE indicating which version of the MAC management message will be sent.

15. The mobile station of claim 14, wherein the set of one or more parameters of the BCP-IE comprises a configuration change counter (CCC), a fragment index, or a total number of fragments value.

16. A base station for wireless communications via orthogonal frequency-division multiplexing (OFDM) or orthogonal frequency division multiple access (OFDMA), comprising:
means for determining a set of one or more mobile stations (MSs) that are in an unavailable state;
means for determining a set of frames in which to send a new media access control (MAC) management message such that the new MAC management message is received by each MS in the set of MSs prior to the new MAC management message taking effect; and
means for transmitting the new MAC management message during each frame in the set of frames.

17. The base station of claim 16, wherein the means for determining the set of frames in which to send the new MAC management message comprises:
means for selecting the set of frames such that the set of frames is a smallest set of frames, while the new MAC management message is received by each MS in the set of MSs.

18. The base station of claim 16, wherein the means for determining the set of frames in which to send the new MAC management message comprises means for implementing a heuristic algorithm to determine the set of frames.

19. A computer-program storage apparatus for a mobile station, comprising a memory device having a set of instructions stored thereon, the set of instructions being executable by one or more processors, and the set of instructions comprising:
instructions for receiving, during a listening interval of a low power state, a message with a broadcast control pointer information element (BCP-IE) indicating when a media access control (MAC) management message will be sent, the MAC management message being a service identity broadcast information advertisement (SII-ADV) message;
instructions for determining if a version of the MAC management message to be sent matches a previously received version of the MAC management message; and
instructions for altering a schedule of the low power state to wake-up and receive the MAC management message in response to the version of the MAC management message to be sent not matching the previously received version.

20. The apparatus of claim 19, wherein the instructions for determining if the version of the MAC management message to be sent matches the previously received version of the MAC management message, comprises:
instructions for examining a set of one or more parameters of the BCP-IE indicating which version of the MAC management message will be sent.

21. The apparatus of claim 20, wherein the set of one or more parameters of the BCP-IE comprises a configuration change counter (CCC), a fragment index, or a total number of fragments value.

22. A computer-program storage apparatus for a base station, comprising a memory device having a set of instructions stored thereon, the set of instructions being executable by one or more processors, and the set of instructions comprising:

instructions for determining a set of one or more mobile stations (MSs) that are in an unavailable state;

instructions for determining a set of frames in which to send a new media access control (MAC) management message such that the new MAC management message is received by each MS in the set of MSs prior to the new MAC management message taking effect; and instructions for transmitting the new MAC management message during each frame in the set of frames.

23. The apparatus of claim 22, wherein the instructions for determining the set of frames in which to send the new MAC management message comprises:

instructions for selecting the set of frames such that the set of frames is a smallest set of frames, while the new MAC management message is received by each MS in the set of MSs.

24. The apparatus of claim 22, wherein the instructions for determining the set of frames in which to send the new MAC management message comprises instructions for implementing a heuristic algorithm to determine the set of frames.

* * * * *